United States Patent [19]

Lu

[11] 4,291,111
[45] Sep. 22, 1981

[54] NITROGEN-CONTAINING ADDITIVES FOR MAGNETIC TONERS HAVING HYDROPHOBIC AND HYDROPHILIC MOIETY

[75] Inventor: Chin H. Lu, Webster, N.Y.

[73] Assignee: Xerox Corporation, Stamford, Conn.

[21] Appl. No.: 11,621

[22] Filed: Feb. 9, 1979

Related U.S. Application Data

[63] Continuation of Ser. No. 854,861, Nov. 25, 1977, abandoned.

[51] Int. Cl.³ .......................... G03G 9/00; G03G 9/08
[52] U.S. Cl. .................................. 430/107; 430/110; 430/903
[58] Field of Search ............... 430/107, 109, 110, 903

[56] References Cited
U.S. PATENT DOCUMENTS

| | | | |
|---|---|---|---|
| 3,639,245 | 2/1972 | Nelson | 430/903 |
| 3,826,747 | 7/1974 | Nagashima et al. | 430/110 |
| 3,893,935 | 7/1975 | Jadwin et al. | 430/110 |
| 3,944,493 | 3/1976 | Jadwin | 430/110 |
| 4,171,274 | 10/1979 | Schwarz et al. | 430/110 |

*Primary Examiner*—Richard L. Schilling
*Assistant Examiner*—John L. Goodrow
*Attorney, Agent, or Firm*—E. O. Palazzo

[57] ABSTRACT

Magnetic toners, methods of their formation and utilization of the toners in various electrophotographic imaging systems is disclosed. The toners disclosed contain a nitrogen containing compound including, for example, amines and quaternary ammonium compounds. Toners containing such compounds are suitable for use in inductive development from a biased magnetic toner brush to an electrostatic image, and further subsequently such images may be transferred preferably by electrostatically type methods to a substrate such as plain bond paper.

6 Claims, No Drawings

NITROGEN-CONTAINING ADDITIVES FOR MAGNETIC TONERS HAVING HYDROPHOBIC AND HYDROPHILIC MOIETY

This is a continuation of application Ser. No. 854,861, filed Nov. 25, 1977, now abandoned.

BACKGROUND OF THE INVENTION

This invention generally relates to development of images and more specifically to electrophotographic development employing magnetic toner particles which can be applied from a magnetic brush to the electrostatic latent image without using a carrier material as is normally employed in most development systems.

The use of development systems for magnetic development without employing carrier materials has been suggested for example, in Wilson U.S. Pat. No. 2,846,333 which discloses the use of magnetic brush system to apply toner particles formed of ferrites and resin materials for developing electrostatic latent images. Although this process performs satisfactorily in most environments, the conductivity of the toner resulted in some instances in causing the electrostatic transfer to be somewhat difficult.

Kotz U.S. Pat. No. 3,909,258 also teaches the development of magnetic systems without carriers and more specifically there is described in this patent an electrostatic development process employing an inductive magnetic brush without carrier. A toner useful in the magnetic development process of the Kotz patent is described in Nelson U.S. Pat. No. 3,639,245 which teaches a dry toner particle having specific electric conductivity. This type of toner is prepared by blending magnetite with the resin and subsequently pulverizing the material to a small particle size. These particles are then mixed with conductive carbon black which is imbedded in the surface of the particle and small particles of $SiO_2$ are mixed into the toner to improve flowability. One disadvantage of this type of toner although it is sufficient for most purposes, is that it does not transfer consistently from a photoconductive substrate to a plain bond paper thereby resulting in some instances in image quality of lower resolution that is normally expected. More specifically, the poor transfer efficiency results in low image density and causes photoreceptor cleaning problems.

Also of interest is U.S. Pat. No. 3,345,294 which discloses a development system employing a magnetic brush comprising magnetic carrier particles and magnetic toner, and in one embodiment the brush may be electrically biased. A problem encountered with this type of system is the difficulty in providing a toner that will both be charged properly triboelectrically, be held magnetically during development and continue to retain its charge after development in order that it will be able to transfer electrostatically. Many times magnetic type behaving toners are conductive enough that there is difficulty with charge exchange that occurs with the photoreceptor and further difficulty with powder clouds developing in the developing housing.

Accordingly, there is a need for magnetic toners suitable for use in one component magnetic development systems, such toners also being suitable for high speed development and having acceptable electrostatic transfer characteristics for transfer from a photoconductive surface to plain bond paper. A magnetic pigment coating which aids field dependence without introducing undesirable properties such as humidity sensitivity into the toner is also needed. It would also be desirable to have methods of rendering pigments hydrophobic. It is also important to have toner compositions to transfer to paper for example, they will adhere effectively by electrostatic forces in order that image disturbances which will cause blurring do not readily occur when the unfused image is processed prior to fixing.

In a copending application U.S. Ser. No. 792,636, filed May 2, 1977, on Single Component Magnetic Toner, the subject matter of this application which is hereby totally incorporated by reference, there is disclosed a coating of magnetic pigments with fatty acid prior to mixing with the resin and spray drying to form a toner which will produce field dependent toner material. However, there continues to be a need for additional field dependent type toners.

SUMMARY OF THE INVENTION

It is an object of this invention to provide a toner which overcomes the above-noted disadvantages.

It is a further object of this invention to provide a toner which will produce clear sharp images by magnetic development using an inductive magnetic toner brush without carrier.

Yet another object of this invention is to prepare toners that have low powder clouding in magnetic brush with carrier systems.

It is still another object of this invention to produce pigments for toner that will transfer electrostatically from a photoreceptor to a plain bond paper without causing blurring, and to form magnetic toner with even dispersion of magnetic pigments, the concentration of the pigment in each particle is approximately the same.

It is yet a further object of this invention to prepare a pigment for toner whose electrical resistivity is field dependent and also to provide superior toners for electrostatic imaging.

Also another object of this invention is to provide pigments which will form toners that do not blur nor are they adversely affected thereby reducing image resolution upon handling of unfused toner images.

These and other objects of the invention are accomplished by preparing magnetic toners comprised of magnetic pigments, resin, and an additive comprised of at least one hydrophobic moiety and one hydrophilic moiety, the hydrophilic moiety being comprised of a nitrogen containing compound. The nitrogen containing compound can be selected from numerous known materials including for example, amines and quaternary ammonium compounds, as will be further illustrated hereinafter. The nitrogen additive containing toners can develop inductively from a single component magnetic toner brush and further can also transfer electrostatically after development. The nitrogen containing toners of this invention also allow effective good development and transfer in a bias magnetic brush system using both a magnetic carrier and a magnetic toner with low powder clouding and excellent transfer because of the low tribo exchange with the photoreceptor.

In one preferred embodiment of the present invention a toner is formed by spray drying an appropriate organic solvent such as a toluene dispersion of Mapico Black magnetite (Cities Service Co.), styrenebutylmethacrylate resin, and the nitrogen containing material. In one embodiment from about 40 to 65 parts by weight of Mapico Black magnetite, 1 to 3 parts by weight of the nitrogen containing compound with the remaining formulation containing a sufficient amount of styrene-n-butylmethacrylate resin so as to total 100 parts, for example when 52 parts of magnetite and 1 part of nitrogen containing compound is used, 47 parts of the resin is employed. This toner can be used to develop inductively from single component magnetic toner brush and also transfer electrostatically from the photoreceptor after development of the electrostatic latent image.

DESCRIPTION OF THE INVENTION

It is important to note that the toner of the present invention generally has resistivity that is dependent on the strength of the electrical field as evidenced by the ability of these toners to electrostatically transfer without the use of a specially treated paper or special transfer techniques such as pressure, or the use of adhesives after development inductively from a magnetic toner brush. The toner is conductive at high fields in order to allow easy development by inductive techniques.

The toners of the present invention generally have a resistivity greater than $10^{10}$ ohm-cm at low fields of about 10 volt/cm. The high resistivity of greater than about $10^{10}$ ohm-cm is maintained at least up to about 1,000 volts/cm field strength. The preferred initial resistivity is greater than $10^{14}$ ohm-cm because this allows good transfer of the electrostatic image.

The magnetic pigments in toners of the present invention are magnetic in the sense that they are attracted to a magnet; however, they are not magnets themselves. Generally, the toners are held to a magnetic brush roller or belt by magnetic forces and a charge opposite to that carried by the photoreceptor is induced into the toner particles from the charge on the photoreceptor. Subsequently, the outer particles develop into the electrostatic image as the electrostatic forces overcome the magnetic forces whereby toner is deposited in the image areas. The type of forces being present and the development process utilizing a magnetic brush system without a carrier is fully disclosed in U.S. Pat. No. 3,909,258.

Many magnetic pigments can be used to form the toner of the present invention, but as long as the particles which comprise the pigments allow the achievement of the desired magnetic and electrical properties in a toner which is to be subsequently prepared. Illustrative of such materials are ferrites, iron particles, and nickel alloys. In the present invention, the use of magnetite particles are preferred as they are black in color, not very costly, and further they provide excellent magnetic properties. These magnetite particles may be of any shape or size as long as there results a semiconductive particle with acceptable transfer properties. The particle size of the pigment is generally between about 0.02 microns and about 1 micron, a preferred average particle size for the magnetite particles being about 0.1 to about 0.6 microns. These particles can be of any shape including a circular or cubic.

The nitrogen containing compounds useful for the toner of the present invention comprise at least 1 hydrophobic moiety and 1 hydrophilic moiety.

The hydrophobic moiety used is generally a long chain hydrocarbon having from about eight to about 22 carbon atoms. Illustrative examples of such hydrocarbons include materials of the following formulas:

wherein n is a number of from about 8 to 22. Specific examples of the type of hydrocarbons used include $C_8H_{17}$, $C_{12}H_{25}$, $C_{16}H_{33}$, $C_{22}H_{45}$, $C_8H_{15}$, $C_{10}H_{19}$, $C_{15}H_{29}$, and $C_{20}H_{39}$.

The hydrophilic moiety is a nitrogen containing structure. The compound used is selected in such a manner so that it is compatible with the toner resin in order that it can be dispersed therein and does not form a separate phase. Numerous nitrogen containing compounds can be used for the preparation of the toner including for example amines such as primary, secondary and tertiary amines, and quaternary ammonium compounds. Examples of amines that can be used include those of the following formulas:

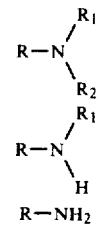

wherein R is an aliphatic radical containing from about 8 to about 22 carbon atoms, $R_1$ and $R_2$ are hydrocarbon radicals containing from 1 to 22 carbon atoms including for example methyl, ethyl, propyl, butyl, isobutyl, tertiary butyl, pentyl, octyl, nonyl, pentadcamyl and eicosene.

The quaternary ammonium compounds that are useful are of the following general formula:

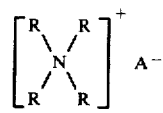

in which at least one R is a hydrocarbon having from about 8 to about 22 carbon atoms and each other R is a hydrogen or a hydrocarbon having from 1 to about 22 carbon atoms, and A is an atom, for example, sulfate, borate, chlorate, and the halogens such as iodide, chloride, and bromide.

Some specific preferred compounds utilized in the practice of the present invention include distearyl dimethyl ammonium chloride, cetyl dimethyl benzyl ammonium chloride, cetyl trimethyl ammonium bromide, cetyl dimethyl ethyl ammonium chloride, stearyl dimethyl benzyl ammonium chloride, myristyl dimethyl benzyl ammonium chloride, substituted imidazoline, substituted oxazoline, cetyl amine, various fatty amines and diamines.

The nitrogen containing additive may be used in any amount that results in a toner that develops and electrostatically transfers well in a single component magnetic toner brush or provides good development and efficient electrostatic transfer in a biased magnetic brush of magnetic toner and carrier. For example the amount of nitrogen containing additive used can be between about 0.1 and about 10 weight percent of total toner weight. In one preferred embodiment the nitrogen containing additive is used in amount of between about 0.5 to about 3 percent by weight of the toner. This amount generally produces the desired increased toner properties without leading to an increase in the blocking or agglomeration tendencies of the toner and also allows easier complete dispersion in the toner.

Any suitable forming method may be utilized to produce the toner of the present invention. Typical of toner forming methods are melt dispersion in a liquid followed by cooling and the conventional mastication followed by cooling and attrition. The preferred method of formation is spray drying of a solvent dispersion of resin, magnetic pigment and nitrogen additive as this method produces good additive dispersion in the resin.

The toner resins for use with the coated pigment of the invention may be selected from any suitable toner resin material that is compatible with the nitrogen containing additive of the magnetite.

While any suitable resin may be employed in the system of the present invention, typical of such resins are polyamices, epoxies, polyurethanes, vinyl resins and polymeric esterification products of a dicarboxylic acid and a diol comprising a diphenol. Any suitable vinyl resin may be employed in the toners of the present system including homopolymers or copolymers of two or more vinyl monomers. Typical of such vinyl monomeric units include: styrene, p-chlorostyrene, vinyl napthalene; ethylenecally unsaturated mono-olefins such as ethylene, propylene, butylene, isobutylene and the like; vinyl esters such as vinyl chloride, vinyl bromide, vinyl fluoride, vinyl acetate, vinyl propionate, vinyl benzoate, vinyl butyrate and the like; esters of alphamethylene aliphatic monocarboxylic acids such as methyl acrylate, ethyl acrylate, n-butylacrylate, isobutyl acrylate, dodecyl acrylate, n-octyl acrylate, 2-chloroethyl acrylate, phenyl acrylate, methyl-alpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropyl ketone and the like; vinylidene halides such as vinylidene chloride, vinylidene chlorofluoride and the like; and N-vinyl indole, N-vinyl pyrrolidene and the like; and mixtures thereof.

Generally toner resins containing a relatively high percentage of styrene are preferred since greater image definition and density is obtained with their use. The styrene resin employed may be a homopolymer of styrene or styrene homologs of copolymers of styrene with other monomeric groups containing a single methylene group attached to a carbon atom by a double bond. Any of the above typical monomeric units may be copolymerized with styrene by addition polymerization. Styrene resins may also be formed by the polymerization of mixtures of two or more unsaturated monomeric materials with a styrene monomer. The addition polymerization technique employed embraces known polymerization techniques such as free radical, anionic and cationic polymerization processes. Any of these vinyl resins may be blended with one or more other resins if desired, preferably other vinyl resins which insure good triboelectric properties and uniform resistance against physical degradation. However, non-vinyl type thermoplastic resins may also be employed including resin modified phenolformaldehyde resins, oil modified epoxy resins, polyurethane resins, cellulosic resins, polyether resins and mixtures thereof.

Polymeric esterification produces of a dicarboxylic acid and a diol comprising a diphenol may also be used as a preferred resin material for the toner compositions of the instant invention. The diphenol reactant has the general formula:

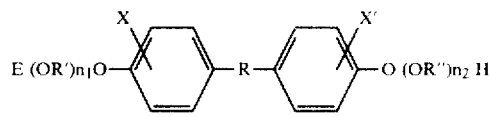

wherein R represents substituted and unsubstituted alkylene radicals having from 2 to 12 carbon atoms, alkylidene radicals having from 1 to 12 carbon atoms and cycloalkylidene radicals having from 3 to 12 carbon atoms; R' and R'' represent substituted and unsubstituted alkylene radicals having from 2 to 12 carbon atoms, alkylene arylene radicals having from 8 to 12 carbon atoms and arylene radicals; X and X' represents hydrogen or an alkyl radical having from 1 to 4 carbon atoms; and $n_1$ and $n_2$ are each at least 1 and the average sum of $n_1$ and $n_2$ is less than 21. Diphenols wherein R represents an alkylidene radical having from 2 to 4 carbon atoms and R' and R'' represents an alkylene radical having from 3 to 4 carbon atoms are preferred because greater blocking resistance, increased definition of xerographic characters and more complete transfer of toner images are achieved. Optimum results are obtained with diols in which R' is an isopropylidene radical and R' and R'' are selected from the group consisting of propylene and butylene radicals because the resins formed from these diols possess higher agglomeration resistance and penetrate extremely rapidly into paper receiving sheets under fusing conditions. Dicarboxylic acids having from 3 to 5 carbon atoms are preferred because the resulting toner resin possess greater resistance to film formation on reusable imaging surfaces and resist the formation of fines under machine operation conditions. Preferred results are obtained with alpha unsaturated dicarboxylic acids including fumaric acid, maleic acid or maleic acid anhydride because maximum resistance to physical degradation of the toner as well as rapid melting properties are achieved. Any suitable diphenol which satisfies the above formula may be employed. Typical such diphenols include: 2,2-bis(4 beta hydroxy ethoxy phenyl)-propane, 2,2-bis(4-hydroxy isopropoxy phenyl)propane, 2,2-bis(4-beta hydroxy ethoxy phenyl)pentane, 2,2-bis(4-beta hydroxy ethoxy phenyl)-butane, 2,2-bis(4-hydroxy-propoxy-phenyl)-propane, 2,2-bis(4-hydroxy-propoxy-phenyl)propane, 1,1-bis(4-hydroxy-ethoxy-phenyl)-butane, 1,1-bis(4-hydroxy isopropoxy-phenyl)-heptane, 2,2-bis(3-methyl-4-beta-hydroxy ethoxy-phenyl)propane, 1,1-bis(4-beta hydroxy ethoxy phenyl)-cyclohexane, 2,2'-bis(4-beta hydroxy ethoxy phenyl)-norbornane, 2,2'-bis(4-beta hydroxy ethoxy phenyl)norbornane, 2,2-bis(4-beta hydroxy styryl oxyphenyl)propane, the polyoxyethylene ether of isopropylidene diphenol in which both phenolic hydroxyl groups are oxyethylated and the average number of oxyethylene groups per mole is 2.6, the polyoxypropylene ether of 2-butylidene diphenol in which both the phenolic hydroxy groups are oxyalkylated and the average number of oxypropylene groups per mole is 2.5, and the like. Diphenols wherein R represents an alkylidene radical having from 2 to 4 carbon atoms and R' and R'' represent an alkylene radical having from 3 to 4 carbon atoms are preferred because greater blocking resistance, increased definition of xerographic characters and more complete transfer of toner images are achieved. Optimum results are obtained with diols in which R is isopropylidene and R' and R" are selected from the group consisting of propylene and butylene because the resins formed from these diols possess higher agglomeration resistance and penetrate extremely rapidly into paper receiving sheets under fusing conditions.

Any suitable dicarboxylic acid may be reacted with a diol as described above to form the toner compositions of this invention either substituted or unsubstituted, saturated or unsaturated, having the general formula:

$$HOOC\ R'''_{n_3}COOH$$

wherein R''' represents a substituted or unsubstituted alkylene radical having from 1 to 12 carbon atoms, arylene radicals or alkylene arylene radicals having from 10 to 12 carbon atoms and $n_3$ is less than 2. Typical such dicarboxylic acids including their existing anhydrides are: oxalic acid, malonic acid, succinic acid, glutaric acid, adipic acid, pimelic acid, suberic acid, azelaic acid, sebacic acid, phthalic acid, mesaconic acid, homophthalic acid, isophthalic acid, terephthalic acid, o-phenyleneacetic-beta-propionic acid, itaconic acid, maleic acid, maleic acid anhydride, fumaric acid, phthalic acid anhydride, traumatic acid, citraconic acid, and the like. Dicarboxylic acids having from 3 to 5 carbon atoms are preferred because the resulting toner resins possess greater resistance to film formation on reusable imaging surfaces and resist and formation of fines under machine operation conditions. Optimum results are obtained with alpha unsaturated dicarboxylic acids including fumaric acid, maleic acid, or maleic acid anhydride as maximum resistance to physical degradation of the toner as well as rapid melting properties are achieved. The polymerization esterification products may themselves be copolymerized or blended with one or more other thermoplastic resins, preferably aromatic resins, aliphatic resins, or mixtures thereof. Typical thermoplastic resins include: resin modified phenolformaldehyde resin, oil modified epoxy resins, polyurethane resins, cellulosic resins, vinyl type resins and mixtures thereof. When the resin component of the toner contains an added resin, the added component should be present in an amount less than about 50 percent by weight based on the total weight of the resin present in the toner. A relatively high percentage of the polymeric diol and dicarboxylic acid condensation product in the resinous component of the toner is preferred because a greater reduction of fusing temperatures is achieved with a given quantity of additive material. Further, sharper images and denser images are obtained when a high percentage of the polymeric diol and dicarboxylic acid condensation product is present in the toner. Any suitable blending technique may be employed to incorporate the added resin into the toner mixture. The resulting resin blend is substantially homogeneous and highly compatible with pigments and dyes. Where suitable, the colorant may be added prior to, simultaneously with or subsequent to the blending of polymerization step.

Optimum electrophotographic results are achieved with styrene-butyl methacrylate copolymers, styrene-vinyltoluene copolymers, styrene-acrylate copolymers, polystyrene resins, predominately styrene or polystyrene based resins as generally described in U.S. Pat. No. 25,136 to Carlson and polystyrene blends as described in U.S. Pat. No. 2,788,288 to Rheinfrank and Jones.

The solvent used for spray drying may be any material capable of dissolving the toner resin and the additive without adversely effecting the additive or the magnetite. Solvents for toner resins are well known include hydrocarbons, alcohols, ketones, esters, amides, fluorinated hydrocarbons, chlorinated hydrocarbons and other well known solvents. Preferred solvents are toluene for use with styrene polymer blends as this results in a toner that is solvent free and the solvent is low cost and relatively non-flammable. Chloroform has been found to be a preferred solvent for use with polyester type toner resins as it is readily available, non-flammable and results in a toner of low residual solvent. Both chloroform and toluene also are compatible with the preferred phosphate. The solvent is generally used in an amount such that the solids content of the solvent slurry is 5–20% by weight. The term solids content is used here to indicate the solid resulting from spray drying which is the resin, phosphorous additive and magnetite plus any other additives to the toner such as colorants or triboelectric regulators.

The addition of additives to the solvent prior to spray drying for inclusion in the toner are embraced by the present invention. Additives such as dyes, pigments, dispersing agents, humidity sensitivity control materials may be added prior to toner formation. Suitable black colorants are carbon black pigments and nigrosine dyes. The preferred magnetite materials of the instant process are black and therefore suitable for the majority of electrophotographic reproduction uses without benefit of colorant additives. However, other less dark colored magnetic materials might require pigment or dye additives to obtain a suitable toner color. Such pigments and dyes while useful are generally not needed to obtain a suitable toner color, or needed to obtain field dependency of the toners.

It is further contemplated that after treatment process such as classification might be necessary depending on the particle size range achieved by the spray drying or other formation process.

DESCRIPTION OF THE PREFERRED EMBODIMENTS

The following Examples further define, describe and compare methods of preparing toners of the present invention, and of using these toners in electrophotographic systems. Parts and percentages are by weight unless otherwise indicated.

EXAMPLE 1

There was prepared a toner using melt mixing followed by attrition of a formulation of about 70 parts of Mapico Black magnetite (Cities Service Co.), about 27 parts of 65/35 styrene-n-butyl methacrylate and about 3 parts of dimethyl dihydrogenated tallow ammonium chloride. The powder resistivity of this toner is $10^{14}$ ohm-cm at field strengths of 40 volts/cm.

This toner was used in an induction magnetic development system without a carrier in a Mita Copystar 700D copier using ZnO paper and was found to produce images of good quality with low background. In a separate test this toner was also found to transfer well electrostatically to plain bond paper. The ability of the toner to develop in an inductive magnetic brush system indicates that the toner is conductive at high field strengths and therefore field dependent.

EXAMPLE II

The method of Example I is repeated with the exceptions that about 65 parts of Mapico Black magnetite and 32 parts of 65/35 styrene-n-butyl methacrylate, and 3 parts of tallow trimethylene diamine dioleate (Armak Co.) were used in preparing the toner. Similar results as reported in Example I were noted including a powder resistivity of $10^{15}$ ohm-cm at field strengths of 40 volts/cm. The toner transfers well electrostatically after development with a single component magnetic toner brush.

EXAMPLE III

Spray drying was used to prepare a toner containing 52 parts of M04431 magnetite (Pfizer Co.), 47 parts of 65/35 styrene-n-butyl and 1 part of stearyl imidazoline (Ciba-Geigy Co.). Similar results as reported in Examples I and II were noted, for example the toner transferred well electrostatically after development with a single component magnetic toner brush. The powder resistivity of this toner was $10^{13}$ ohm/cm at field strengths of 40 volts/cm.

The spray drying technique which is well known in the art involves forming a dispersion of the above materials in a solvent such as toluene (2,000 grams), and spray drying the dispersion with a Bowen spray dryer that has a feed rate of about 300 millilitens per minute and an air field temperature of between about 180° F. and 220° F.

EXAMPLE IV

The method of Example III is repeated with the exceptions that a mixture of 52 parts of Mapico Black magnetite, 47 parts of 65/35 styrene-n-butyl methacrylate and 1 part of distearyl dimethyl ammonium chloride is prepared. Similar results were obtained. The toner for example had excellent development and transfer properties. The toner powder had a powder resistivity of $10^{16}$ ohm-cm at field strengths of 80 volts/cm.

EXAMPLE V

The process of Example III is repeated with the exception that about 47 parts of Piccolastic D-125, a polystyrene resin is substituted for the 65/35 styrene-n-butyl methacrylate. The resulted toner demonstrated good development and transfer properties.

EXAMPLE VI

The process of Example II is repeated with the exception that about 3 parts of tallow trimethylenediamine is substituted for the tallow trimethylenediamine dioleate. The resultant toner demonstrated good development and transfer properties.

EXAMPLE VII

The toner of Example I is utilized in a biased magnetic brush developer with a steel carrier. The loading is about 3 parts toner to one hundred parts carrier. Development onto an electrostatic image carried by a photoreceptor is clear and sharp. Electrostatic transfer is effective. Visual observation is that the powder clouding of the toner in the developer housing is less than normal.

The resistivity measurements for toner are determined by the following process. Measurements on powder are complicated by the fact that the results are influenced by characteristics of the powder particles, shape and size in addition to powder composition. Therefore, measurements were obtained on powder rather than by molding the powder into a pellet specimen in order to better relate the properties to the toner behavior in development. The measurements were made using a two inch diameter electrode of a Balsbaugh cell for measuring the direct current resistivity of the toner. The gap distance is 0.05 inch. The toner is packed between the electrodes of the cell by vibration until a constant bed folume is reached. The current is measured as a function of applied voltage at the 40 mil gap. The electrification time is 1 minute as recommended by ASTM method, ASTM Designation D-257-66 (Reapproved 1972). After each measurement the sample is repacked by vibration. Resistivity is calculated according to Ohms law.

Although specific materials and conditions were set forth in the above exemplary processes in the formation and using the toner of the invention these are merely intended as illustrations of the present invention. Various other substituents and processes such as those listed above may be substituted for those in the examples with similar results. In addition to the steps used in formation of the toner of the present invention other steps or modifications may be used. For instance the pigment could be classified or separated by other filtering methods. In addition other materials such as colorants could be added.

The magnetic pigment of the invention may be utilized in any amount that forms a magnetic field dependent toner. A suitable range has been found to be a magnetic pigment content between about 40 and about 70 weight percent of magnetic particles in the finished toner. A preferred range is a magnetite content between about 45 and 55 weight percent of magnetite for good magnetic development properties and good transfer.

Other modifications of the present invention will occur to those skilled in the art upon reading of the present disclosure. These are intended to be included within the scope of this invention. For instance, the magnetic toner particles of this invention could be utilized in the formation of permanent magnets or in a paint as a magnetic coating. Further the method could be used to treat colored pigments for toner use to reduce humidity sensitivity.

What is claimed is:

1. A single component field dependent toner that has a resistivity of $10^{13}$ ohm/cm to $10^{18}$ ohm/cm, and thus is conductive at high fields of up to 1,000 volts/cm, thereby allowing substantially complete transfer of the toner when said toner is utilized in an electrophotographic imaging system, this toner being comprised of a resin, a magnetic pigment, and between about 0.5 to about 10 weight percent of a nitrogen containing compound comprising at least one hydrophobic moiety and one hydrophilic moiety, the nitrogen containing compound being dimethyl dihydrogenated tallow ammonium chloride, tallow trimethylene diamine dioleate, distearyl dimethyl ammonium chloride, or stearylimidazoline.

2. A single component field dependent toner in accordance with claim 1 wherein the resin is a styrene-n-butyl methacrylate copolymer, the magnetic pigment is Mapico Black, and the nitrogen containing compound is dimethyl dihyrgenated tallow ammonium chloride, said compound being present in an amount of 3 percent by weight thereby resulting in a toner that has a resistivity of $10^{14}$ ohm/cm at field strength of about 40 volts/cm.

3. A single component field dependent toner in accordance with claim 1 wherein the resin is styrene-n-butyl methacrylate copolymer, the magnetic pigment is Mapico Black, and the nitrogen containing compound is tallow trimethylene diamine dioleate present in the amount of 3 percent by weight thereby resulting in a toner that has a resistivity of $10^{15}$ ohm/cm at field strengths of 40 volts/cm.

4. A single component field dependent toner in accordance with claim 1 wherein the resin is a styrene-n-butyl methacrylate copolymer, the magnetic pigment is magnetite, and the nitrogen containing compound is stearyl imidazoline, present in an amount of 1 percent by weight, thereby resulting in a toner having a resistivity of $10^{13}$ ohm/cm at a field strength of about 40 volts/cm.

5. A field dependent single component toner in accordance with claim 1 wherein the resin is styrene-n-butyl methacrylate copolymer, the magnetic pigment is Mapico Black, and the nitrogen containing compound is distearyl dimethyl ammonium chloride, present in the amount of 1 percent by weight, which toner has a resistivity of $10^{16}$ ohm/cm at a field strength of about 80 volts/cm.

6. A field dependent single component toner in accordance with claim 1 wherein the resin is polystyrene.

* * * * *